(12) United States Patent
Gieras

(10) Patent No.: US 7,830,057 B2
(45) Date of Patent: Nov. 9, 2010

(54) TRANSVERSE FLUX MACHINE

(75) Inventor: Jacek F. Gieras, Glastonbury, CT (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 12/231,178

(22) Filed: Aug. 29, 2008

(65) Prior Publication Data

US 2010/0052467 A1 Mar. 4, 2010

(51) Int. Cl.
*H02K 21/12* (2006.01)
*H02K 37/00* (2006.01)
*H02K 21/00* (2006.01)

(52) U.S. Cl. .............. 310/156.02; 310/49.11; 310/49.14; 310/152; 310/156.03

(58) Field of Classification Search ............ 310/156.02, 310/254, 49.11, 49.14, 216.106, 156.03, 310/156.07
See application file for complete search history.

(56) References Cited

U.S. PATENT DOCUMENTS

| | | | |
|---|---|---|---|
| 4,973,868 | A | 11/1990 | Wust |
| 5,051,641 | A | 9/1991 | Weh |
| 5,117,142 | A | 5/1992 | Zweygbergk |
| 5,289,072 | A | 2/1994 | Lange |
| 5,543,674 | A | 8/1996 | Koehler |
| 5,777,418 | A | 7/1998 | Lange et al. |
| 5,942,828 | A | 8/1999 | Hill |

(Continued)

FOREIGN PATENT DOCUMENTS

DE 10037787 3/2002

(Continued)

OTHER PUBLICATIONS

Berchten, "Direct Drive Technology: New Opportunities with High Torque Technology" (Press Release), www.servax.com/news/news.htm, 1999, Landert-Motoren AG, Bulach, Switzerland.

(Continued)

*Primary Examiner*—Quyen Leung
*Assistant Examiner*—Jose A Gonzalez Quinones
(74) *Attorney, Agent, or Firm*—Kinney & Lange. P.A.

(57) ABSTRACT

A transverse flux machine (TFM) includes a stator assembly that provides a plurality of U-shaped magnetic circuits placed circumferentially around a rotor assembly. The plurality of U-shaped magnetic circuits being comprised of a first stator segment, a second stator segment, and a plurality of stator yokes. The first stator segment and the second stator segment each have a plurality of poles spaced around a first circumference and a plurality of slots spaced around a second circumference opposite each of the plurality of poles. The plurality of stator yokes each have a first end sized to fit within one of the slots associated with the first stator segment and a second end sized to fit in one of the slots associated with the second stator segment. Positioning of the first and second ends of the stator yokes within the slots of the first and second stator segments, respectively, results in the creation of the plurality of U-shaped magnetic circuits, each magnetic circuit defined by one of the plurality of poles associated with the first stator segment, one of the yokes, and one of the plurality of poles associated with the second stator segment.

20 Claims, 4 Drawing Sheets

U.S. PATENT DOCUMENTS

| | | | |
|---|---|---|---|
| 5,973,436 | A | 10/1999 | Mitcham |
| 6,043,579 | A | 3/2000 | Hill |
| 6,492,758 | B1 | 12/2002 | Gianni et al. |
| 6,700,267 | B2 | 3/2004 | Weiss |
| 6,729,140 | B2 | 5/2004 | Care et al. |
| 6,741,010 | B2 | 5/2004 | Wilkin |
| 6,847,135 | B2 | 1/2005 | Kastinger et al. |
| 6,888,272 | B2 | 5/2005 | Kastinger |
| 6,952,068 | B2 * | 10/2005 | Gieras et al. ............. 310/254.1 |
| 7,030,529 | B2 | 4/2006 | Dommsch et al. |
| 7,124,495 | B2 | 10/2006 | Gieras et al. |
| 7,164,220 | B2 * | 1/2007 | Gilmour et al. ............. 310/266 |
| 7,312,549 | B2 | 12/2007 | Rasmussen |
| 7,466,058 | B2 | 12/2008 | Dubois et al. |
| 7,492,074 | B1 | 2/2009 | Rittenhouse |
| 7,579,742 | B1 | 8/2009 | Rittenhouse |
| 2001/0008356 | A1 | 7/2001 | Wilkin |
| 2004/0155548 | A1 | 8/2004 | Rasmussen |
| 2004/0251759 | A1 | 12/2004 | Hirzel |
| 2006/0192453 | A1 | 8/2006 | Gieras et al. |
| 2007/0216249 | A1 | 9/2007 | Gruendel et al. |
| 2007/0267929 | A1 | 11/2007 | Pulnikov et al. |
| 2008/0136272 | A1 | 6/2008 | Ishikawa |
| 2008/0211326 | A1 | 9/2008 | Kang et al. |
| 2008/0246362 | A1 | 10/2008 | Hirzel |
| 2009/0026869 | A1 | 1/2009 | Kaehler et al. |
| 2009/0108712 | A1 | 4/2009 | Holtzapple et al. |

FOREIGN PATENT DOCUMENTS

| | | |
|---|---|---|
| WO | WO2006117210 | 9/2006 |
| WO | 2007000054 A1 | 1/2007 |
| WO | WO2009070333 | 6/2009 |

OTHER PUBLICATIONS

Bork et al., "New Transverse Flux Concept for an Electric Vehicle Drive System", ICEM'98, 1999, pp. 308-313, Istanbul, Turkey.

Harris et al., "Comparison of Flux-Concentrated and Surface-Magnet Configurations of the VRPM (Transverse-Flux) Machine", ICEM'98, 1998, pp. 1119-1122, Istanbul, Turkey.

Henneberger et al., "On the Parameters Computation of a Single Sided Transverse Flux Motor," Workshop on Electrical Machines' Parameters, Technical University of Cluj-Napoca, pp. 35-40, May 26, 2001.

Kastinger, et al., "Design of a Novel Transverse Flux Machine," Division: Body Electronics, Engineering Advanced Development, Buhl, Germany.

Mecrow et al., "Permanent Magnet Machines for High Torque, Low Speed Applications", ICEM'98, 1998, Istanbul, Turkey.

Anapalahan et al., "Design Steps Towards a High Power Factor Transverse Flux Machine, "Electrical machines and Power Electronics Department of Electrical Engineering, Royal Institute of Technology, Stockholm, Sweden.

Husband et al., The Rolls-Royce Transverse Flux Motor Development, pp. 1435-1440, IEEE, 2003.

"Servax TFM High Torque Drive", www.servax.com/products/tfm/tfm.htm, Landert-Motoren AG, 1999, Bulach, Switzerland.

Weh, Permanentmagneterregte Synchronmaschinen hoher Kraftdichte nach dem Transversalflusskonzept, etzArchiv, 1998, pp. 143-149, vol. 10, No. 5.

Gieras, "Performance Characteristics of a Permanent Magnet Transverse Flux Generator," International Electrical Machines and Drives Conference IEMDC '05, San Antonio, TX, U.S.A., May 15-18, 2005.

Parspour et al., "Transverse Flux Machine Design for Manipulating System Applications," Department of Electrical Machines, Power Electronics and Devices, University of Bremen, Germany.

Vinogradski et al., "Generation of Optimized Current Wave Forms for the Production of Minimized Cogging Torque of Transverse Flux Motors for Direct Drive Applications," Institute of Electrical Drives, Power Electronics and Devices, University of Bremen, Bremen Germany.

Schmidt, 3-D Finite Element Analysis of the Cogging Torque of a Transverse Flux Machine, IEEE Transaction Magnetics, vol. 41, No. 5, pp. 1836-1839, 2005.

Blissenbach et al., "Development of a Transverse Flux Traction Motor in a Direct Drive System."

Svechkarenko et al., Analysis of a Novel Transverse Flux Generator in Direct-Driven Wind Turbines, pp. 1-6, 2006, Stockholm, Sweden.

Hsu, "Flux Guides for Permanent-Magnet Machines," Oak Ridge National Laboratory, Tennessee, U.S.A.

Guo et al., "Study of Permanent Magnet Transverse Flux Motors With Soft Magnetic Composite Core," Australasian Universities Power Engineering Conference (AUPEC 2004), 2004, Brisbane, Australia.

Henneberger et al., "Development of a New Transverse Flux Motor," Institute of Electrical Machines, University of Technology Aachen, pp. 1-6, Aachen Germany.

Maddison et al., Claw Pole Geometries For High Performance Transverse Flux Machines, ICEM 98 Proceedings, vol. 1, International Conference on Electrical Machines, pp. 340-345, 1998, Instanbul Turkey.

Gieras, "Fabrication of the Stator Magnetic Circuit of Transverse Flux Electric Machines," Hamilton Sundstrand.

* cited by examiner

TRANSVERSE FLUX MACHINE

BACKGROUND

This invention relates generally to permanent magnet (PM) machines and more specifically to transverse flux machines.

Permanent magnet (PM) transverse flux machines (TFMs) conduct magnetic flux perpendicular (transverse) to the current in the coil and can produce higher torque density than standard PM brushless machines with longitudinal flux. TFMs are high power density machines and can be used both as motors and generators. Torque increases with the number of poles at a constant stator current. Due to the high number of poles in a TFM, the frequency of electric current in stator windings is high while shaft speed is low. This makes TFMs desirable in a variety of applications including: propulsion motors for land and sea vehicles, electric and hybrid electric vehicles, ship propulsion motors, underwater vehicles, torpedoes, propulsion motors for electric helicopters, elevator propulsion motors, wind generators, integrated starter/generators, and high frequency low speed machines.

TFMs have a three dimensional (3D) magnetic circuit which has traditionally made fabrication and assembly of stator and rotor components difficult. Prior art methods of manufacturing the magnetic circuits require the formation of individual U-shaped magnetic circuits. For example, a U-shaped magnetic circuit may be comprised of a plurality of individual U-shaped laminations stacked together. Assembly of the TFM then requires the correct placement, alignment and spacing of each U-shaped magnetic circuit. Another method known in the prior art is to construct two 3D stacks, each having one half of every magnetic circuit as a series of L-shaped protrusions. When joined together around the coil, the magnetic circuits are completed in the U-shape. This method requires the construction of a stack with a complex 3D shape and requires precise rotational alignment of the two stacks to properly form the magnetic circuits.

There is a need for TFM components that can be efficiently manufactured and assembled.

SUMMARY

The present disclosure is a directed to a transverse flux machine (TFM) that includes a stator assembly that provides a plurality of U-shaped magnetic circuits placed circumferentially around a rotor assembly. The stator assembly includes a first stator segment, a second stator segment, and a plurality of stator yokes. The first stator segment has a plurality of poles spaced around a first circumference of the stator segment and a plurality of slots spaced around a second circumference of the stator segment opposite each of the plurality of poles. The second stator segment has a plurality of poles spaced around a first circumference of the second stator segment and a plurality of slots spaced around a second circumference of the stator segment opposite each of the plurality of poles. The plurality of stator yokes each have a first end sized to fit within one of the slots associated with the first stator segment and a second end sized to fit in one of the slots associated with the second stator segment. Positioning of the first and second ends of the stator yokes within the slots of the first and second stator segments, respectively, results in the creation of the plurality of U-shaped magnetic circuits, each magnetic circuit defined by one of the plurality of poles associated with the first stator segment, one of the yokes, and one of the plurality of poles associated with the second stator segment.

DETAILED DESCRIPTION

This invention relates to a stator (sometimes referred to as an armature) core of a transverse flux machine (TFM), which can be used as a motor, generator, or other electromagnetic device. A TFM, as generally known, relies on a three dimensional (3D) magnetic circuit to act as a conduit for magnetic flux. In an outer stator configuration, the 3D magnetic circuit includes two poles extending toward a PM rotor. According to an embodiment of the present invention, each 3D magnetic circuit is divided into first and second stator segments defined by a plurality of poles and slots, and a plurality of yokes designed to fit within the aligned slots of the first and second stator segments to define a plurality of 3D magnetic circuits around the periphery of the rotor. A benefit of this arrangement is that laminations, which vary in only two-dimensions (e.g., a stator segment lamination may vary in the radial and circumferential directions but not in the axial direction and a stator yoke lamination may vary in height and width, but not depth) and are relatively simple to manufacture, can be used to define both the first and second segments, as well as the stator yokes. In addition, assembly of the plurality of U-shaped magnetic circuits surrounding the periphery of the rotor in an outer stator configuration only requires the alignment of the slots defined in the first stator segment with the slots defined in the second stator segment. This obviates the need for each individual U-shaped magnetic circuit to be separately placed around the periphery of the rotor.

Figure 1:
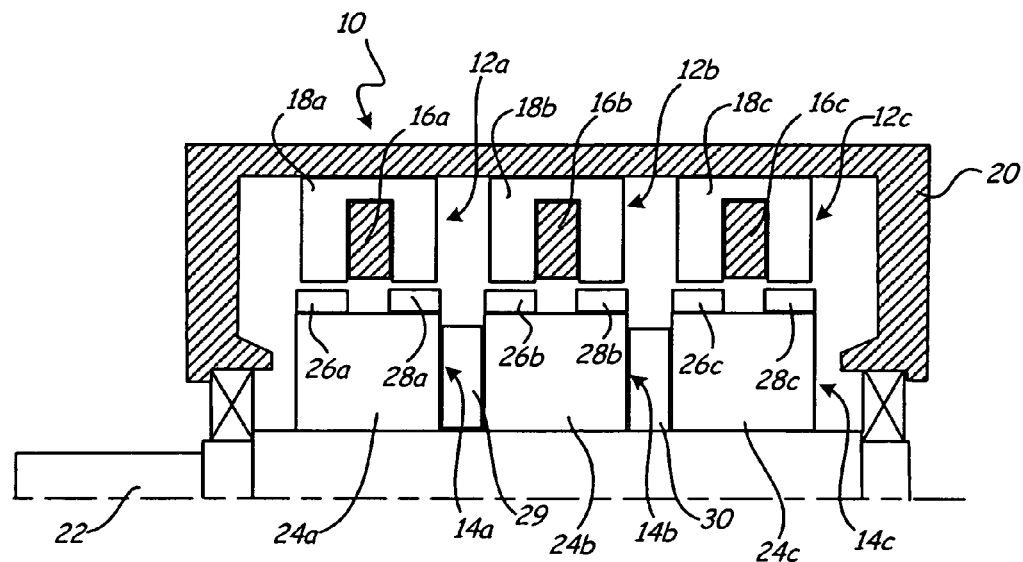
FIG. 1 is a cross-sectional view of a three-phase transverse flux machine with an internal rotor and external stator as known in the prior art.

FIG. 1 is a cross-section of three-phase TFM 10 according to the prior art. TFM 10 includes outer stator assemblies 12a, 12b, and 12c and inner rotor assemblies 14a, 14b, and 14c. Stator assembly 12a includes toroidal or ring coil 16a and a plurality of U-shaped magnetic circuits 18a (only one U-shaped magnetic circuit is shown in this cross-sectional view) located around the periphery of rotor assembly 14a. Stator assemblies 12b and 12c similarly include ring coils 16b and 16c and a plurality of U-shaped magnetic circuits 18b and 18c located around the periphery of rotor assemblies 14b and 14c, respectively. Each U-shaped magnetic circuit is secured in place by an attachment to housing 20, located around the outer periphery of stator assemblies 12a, 12b and 12c.

Rotor assembly 14a is affixed to shaft 22, and includes cylindrical ferromagnetic core 24a and a plurality of permanent magnets 26a and 28a affixed around the periphery of ferromagnetic core 24a. Similar to rotor assembly 14a, rotor assembly 14b is affixed to shaft 22 and includes cylindrical ferromagnetic core 24b and a plurality of permanent magnets 26b and 28b around the periphery of a ferromagnetic core 24b. Rotor assembly 14c is constructed in the same manner as rotor assembly 14b where rotor assembly 14c is affixed to shaft 22 and includes cylindrical ferromagnetic core 24c and a plurality of permanent magnets 26c and 28c around the periphery of a ferromagnetic core 24c. Non-magnetic rings 29 and 30 separate each of rotor assemblies 14a, 14b, and 14c from one another.

Each phase of the three phase electric machine shown in FIG. 1 operates in the same way. Accordingly, the operation of the three-phase electric machine is described with respect to a single phase of the machine as defined by stator assembly 12a and rotor assembly 14a. When operating as a generator, permanent magnets 26a and 28a are caused to rotate by rotating shaft 22 to create a rotating magnetic field. This results in magnetic flux circulating through U-shaped magnetic circuit 18a. In particular, magnetic flux circulates from a first pole (i.e., portion of U-shaped magnetic circuit 18a extending towards permanent magnet 26a) through the top portion of U-shaped magnetic circuit 18a and down through a second pole (i.e., portion of U-shaped magnetic circuit 18a extending towards permanent magnet 28a). An alternating current (AC) voltage is generated in ring coil 16a in response to the circulating magnetic flux. Operating as a motor, ring coil 16a is fed with an AC voltage to create a varying magnetic field that interacts with the magnetic field generated by permanent magnets 26a and 28a. The interaction between these fields causes shaft 22 to rotate at a certain speed.

However, manufacturing and assembling U-shaped magnetic circuits (e.g., magnetic circuit 18a) of the stator in FIG. 1 has traditionally been problematic. Traditional assembly of each stator assembly (e.g., stator assembly 12a shown in FIG. 1) requires the individual placement and attachment of each U-shaped magnetic circuit to housing 20. The assembly process is therefore time-consuming and susceptible to errors. The present invention overcomes this obstacle by dividing the plurality of U-shaped magnetic circuits included within a stator assembly into a series of simple components that are both easy to manufacture and assemble. Specifically, each stator assembly is divided into three parts, a plurality of stator yokes, and a pair of stator segments each having a plurality of poles and slots. Assembly of the pair of stator segments with the plurality of stator yokes results in assembly of the plurality of U-shaped magnetic circuits around the periphery of the rotor. The benefits of this arrangement are described with respect to FIGS. 2-6.

Figure 2:
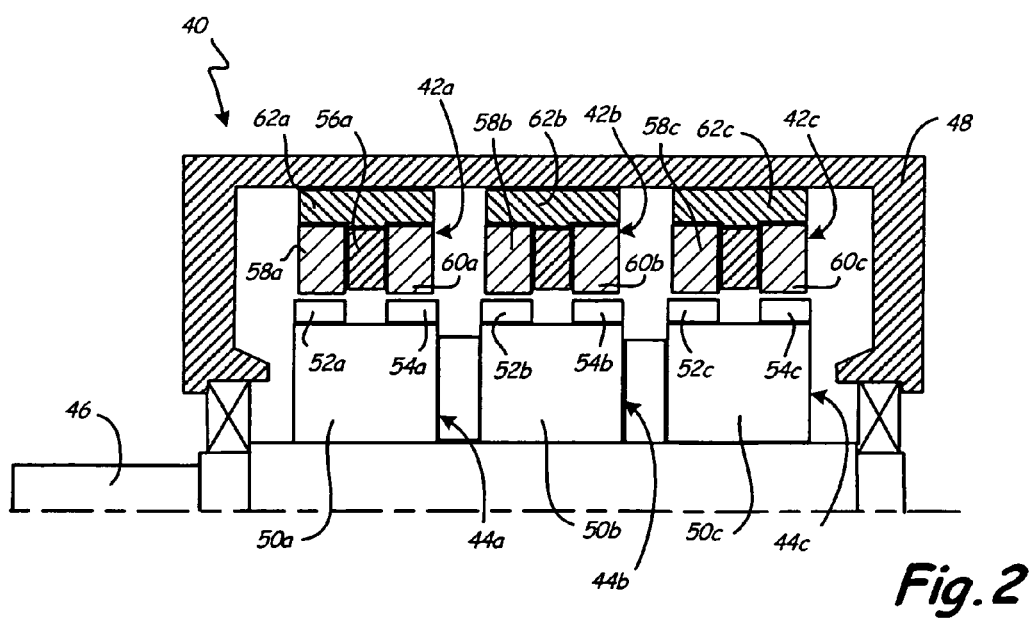
FIG. 2 is a cross-sectional view of a three-phase transverse flux machine (TFM) with an internal rotor and external stator according to an embodiment of the present invention.

FIG. 2 is a cross-sectional view of transverse flux machine (TFM) 40 according to an embodiment of the present invention. TFM 40 includes stator assemblies 42a, 42b, and 42c, rotor assemblies 44a, 44b, and 44c, shaft 46, and housing 48. Rotor assemblies 44a, 44b, and 44c include the same elements as those shown in FIG. 1 with respect to rotor assemblies 14a, 14b, and 14c. Thus, rotor assembly 44a includes cylindrical ferromagnetic core 50a and a plurality of permanent magnets 52a and 54a affixed around the periphery of ferromagnetic core 50a. Rotor assemblies 44b and 44c are constructed in the same way as rotor assembly 44a.

Stator assembly 42a includes ring coil 56a, first stator segment 58a, second stator segment 60a and plurality of yoke segments 62a (only one is visible in this cross-sectional view) that define each of a plurality of U-shaped magnetic circuits located around the periphery of rotor assembly 50a. Stator assembly 42b similarly includes first stator segment 58b, second stator segment 60b, and a plurality of yoke segments 62b. Likewise, stator assembly 42c includes first stator segment 58c and second stator segment 60c as well as a plurality of yoke segments 62c.

Figure 3:
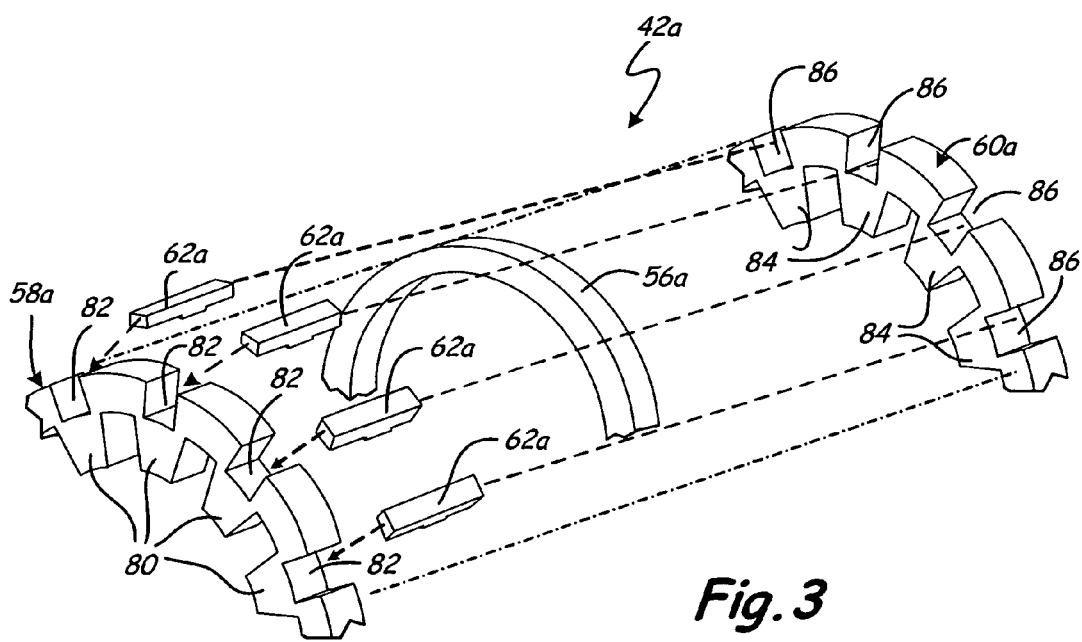
FIG. 3 is an exploded perspective view showing the assembly of the stator segments, ring coil, and stator yokes according to an embodiment of the present invention.

As described in more detail with respect to FIG. 3, first stator segment 58a includes a plurality of poles defining a first portion of each U-shaped magnetic circuit located around the periphery of rotor assemblies 50a. Second stator segment 60a includes a plurality of poles defining a second portion of each U-shaped magnetic circuit located around the periphery of rotor assemblies 50a. In an exemplary embodiment, for each pole defined by first stator segment 58a and corresponding pole defined by second stator segment 60a, a yoke segment 62a is positioned to connect the poles together to form a U-shaped circuit. In this way, first stator segment 58a, second stator segment 60 and a plurality of yoke segments 62a are combined to form a plurality of U-shaped magnetic circuits around the periphery of rotor assembly 50a. Similarly, first stator segment 58b, second stator segment 60b and yoke segments 62b included within stator assembly 52b are combined to form a plurality of U-shaped magnetic circuits around the periphery of rotor assembly 50b; and first stator segment 58c, second stator segment 60c and yoke segments 62c are combined to form a plurality of U-shaped magnetic circuits around the periphery of rotor assembly 50c.

Unlike the prior art TFM 10 illustrated in FIG. 1, in which each U-shaped magnetic circuit is individually fabricated and positioned around the rotor assemblies, the U-shaped magnetic circuits in the present invention are divided into separate components that in one embodiment consist of easy to manufacture laminations (as described in more detail with respect to FIGS. 4-6) that are also easy to assemble (as described with respect to FIG. 3). Operation of TFM 40 remains the same as that described with respect to TFM 10 of FIG. 1, wherein magnetic flux is circulated through each U-shaped magnetic circuit. For example, with respect to stator assembly 42a, magnetic flux would circulate from a pole defined by first stator segment 58a to yoke 62a, and from yoke 62a through a pole defined by second stator segment 60a. A benefit of the present invention is the ability to cost-efficiently fabricate and assemble the individual segments making up the stator.

FIG. 3 is an exploded perspective view showing stator assembly 42a, which includes ring coil 56a, first stator segment 58a, a plurality of yokes 62a, and second stator segment 60a. In the embodiment shown in FIG. 3, first stator segment 58a is ring-shaped and includes a plurality of poles 80 defined around the inner periphery of first stator segment 58a, and a plurality of slots 82 defined around the outer periphery of first stator segment 58a. Likewise, second stator segment 60a is ring-shaped and includes a plurality of poles 84 defined around the inner periphery of second stator segment 60a, and a plurality of slots 86 defined around the outer periphery of second stator segment 60a.

Stator assembly 42a is assembled by aligning slots 82 defined within first stator segment 58a with slots 86 defined within second stator segment 60a. Ring coil 56a is captured between first stator segment 58a and second stator segment 60a as first stator segment 58a is pressed towards second stator segment 60a. Each U-shaped magnetic circuit is completed by inserting yokes 62a within slots 82 defined within first stator segment 58a and slots 86 defined within second stator segment 60a. Yokes 62a may be held in place by their geometry, the geometry of the stator, or may be secured using a method such as welding, gluing, riveting, or encapsulation. In the embodiment shown in FIG. 3, stator pole portions 80 have a trapezoidal geometry. In other embodiments, stator pole portions 80 have rectangular or square geometries. Likewise, in the embodiment shown in FIG. 3, yokes 62a have a square geometry that mates within square slots 82 defined within each stator segment. In other embodiment, yokes 62a may have a rectangular or oval geometry, which would mate or correspond with similarly shaped slots on the stator segments.

The placement of the stator yokes 62a automatically aligns first stator segment 58a with second stator segment 60a, resulting in each U-shaped magnetic circuit being automatically defined in the correct position around the periphery of a rotor assembly (not shown in this view). In an exemplary embodiment, the number of stator yokes 62a is equal to the number of poles 80 and 84 defined by the first and second stator segments 58a and 60a, respectively. In other embodiments, the number of stator yokes 62a is less than the number of poles 80 and 84 defined by the first and second stator segments 58a and 60a, respectively. In yet another embodiment, each U-shaped magnetic circuit is completed by multiple stator yokes located between each set of stator poles.

Figure 4:
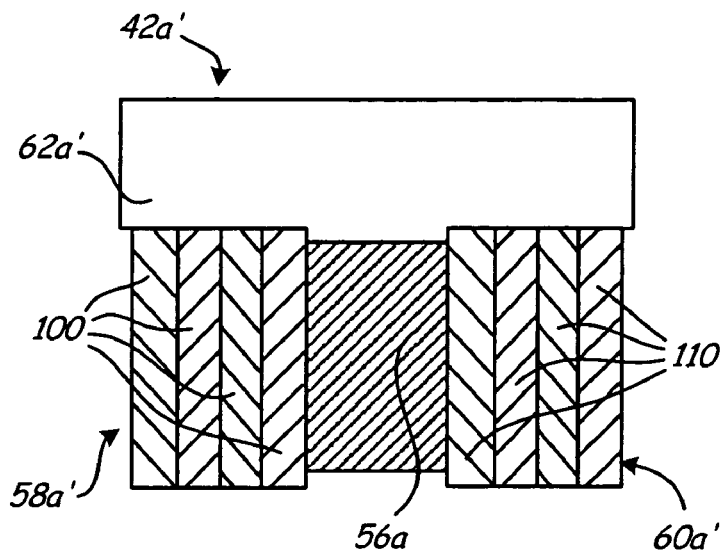
FIG. 4 is a cross-sectional view of a stator according to an embodiment of the present invention.
Figure 5A:
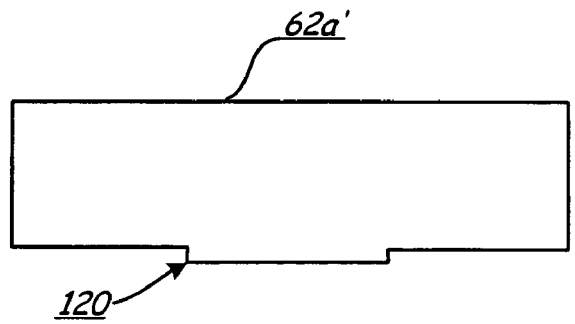
FIG. 5A is a cross-sectional view of a stator yoke employed in the stator according to embodiment of the present invention.
Figure 5B:
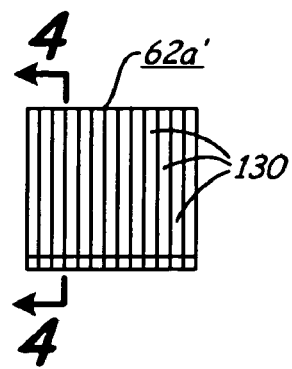
FIG. 5B is a side view of a stator yoke looking down the shaft of the TFM according to an embodiment of the present invention.
Figure 6:
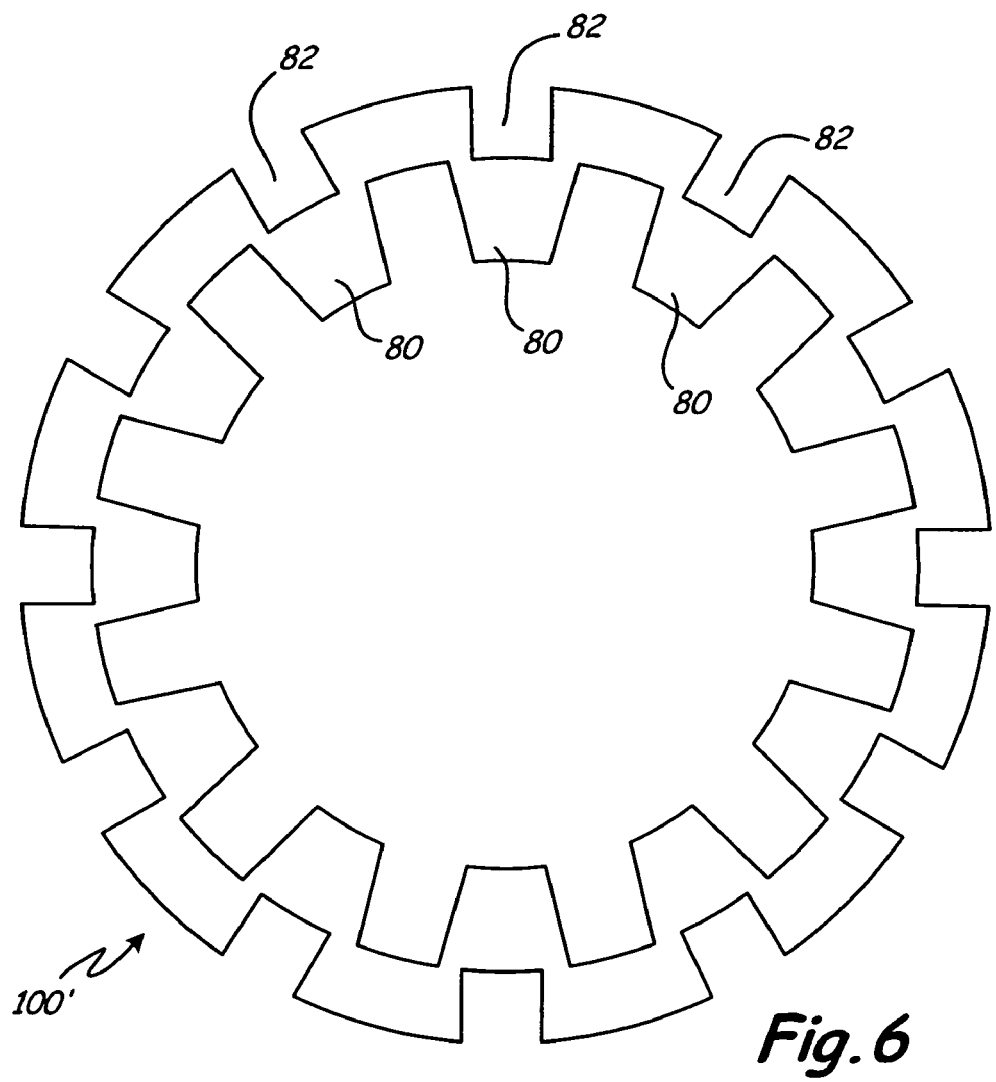
FIG. 6 is a side view of a stator lamination looking down the shaft of the TFM according to an embodiment of the present invention.

In an exemplary embodiment, stator segments 58a and 60a as well as yokes 62a are fabricated by stacking a plurality of laminations (e.g., steel laminations, silicon laminations, etc.) together (as described in more detail with respect to FIGS. 4-6). In another exemplary embodiment, stator segments 58a and 60a as well as yokes 62a are fabricated out of soft magnetic composites (SMCs).

FIG. 4 shows an enlarged view of stator assembly 42a' according to an exemplary embodiment of the present invention making use of laminations. In particular, stator assembly 42a' includes first stator segment 58a', second stator segment 60a', yoke segment 62a', and ring coil 56a. Use of the suffix "'" in labeling stator components indicates a particular embodiment of the components described generally with respect to FIGS. 2 and 3 in which each component is comprised of a plurality of laminations. For example, first stator segment 58a' includes a plurality of individual laminations 100 with a major surface perpendicular to the surface of the paper. Likewise, second stator segment 60a' includes a plurality of individual laminations 110 with a major surface perpendicular to the surface of the paper. Yoke segment 62a' includes a plurality of individual laminations with a major surface parallel to the surface of the paper (although only one lamination is shown in this view, FIG. 5B illustrates the stacking of a plurality of laminations 130). Magnetic flux will only travel through a lamination layer it will not travel between them. Therefore, this arrangement of laminations provides a path for the magnetic flux to travel through the assembled U-shaped magnetic circuit.

FIGS. 5A and 5B illustrate stator yoke segment 62a' with FIG. 5A being oriented in the same plane as the cross sectional views of FIGS. 1 and 2 and FIG. 5B oriented as it would be viewed looking down the shaft, such that individual laminations 130 making up stator yoke segment 62a' are individually visible. In the embodiment shown in FIGS. 5A and 5B, each yoke lamination section includes protrusion portion 120. During assembly, protrusion portion 120 acts as a stop to provide for proper spacing between first stator segment 58a' and second stator segment 60a' to accommodate ring coil 56a.

FIG. 6 is a view of lamination 100 of first stator segment 58a' as it appears looking down the shaft (the same orientation as FIG. 5B). First stator segment 58a' includes a plurality of stator pole portions 80 located around the inner periphery of lamination 100. Opposite each stator pole portion 80 are a plurality of stator slots 82 located around the outer periphery of stator lamination 100.

In the embodiment shown, first stator segment 58a' has twelve stator pole portions 80 and twelve stator slots 82. In other embodiments, the number of poles and stator slots in a stator assembly can vary depending on the application. The number of complete magnetic circuits in each phase of a poly-phase machine should be the same to avoid electric and magnetic imbalance (i.e., the number of magnetic circuits employed in stator assembly 42a as shown in FIG. 2 should be the same as the number of magnetic circuits employed in stator assemblies 42b and 42c).

A benefit of employing laminations as described with respect to FIGS. 4-6 is each of the laminations is relatively simple to manufacture. In particular, each lamination only requires manufacturing (e.g., stamping, machining, etc.) in two of the three dimensions. That is, for stator segments the lamination changes in the circumferential and radial directions, but not in the axial direction (when considered to be oriented within the stator assembly). Assembly of the pair of stator segments (e.g., 58a and 60a) with the plurality of yokes to form the plurality of U-shaped magnetic circuits is simplified by the fact that alignment between the slots of the first and second stator segments for placement of the yoke results in automatic correct positioning of each of the plurality of U-shaped magnetic circuits around the periphery of the rotor assembly.

In an exemplary embodiment, the cross section of the yokes per pole is selected in such a way as to not exceed the maximum permissible value of the magnetic flux density. This is done using standard methods applicable to any electric machine. The magnetic flux density in stator yokes and stator segments is limited by the saturation magnetic flux density of the ferromagnetic material and/or the maximum permissible stator core losses. Saturation magnetic flux density can be estimated on the basis of magnetization curves or B-H curves. For example, the saturation magnetic flux density for silicon laminations is about 2 to 2.1 Tesla and for Hiperco 50™ Cobalt alloy it is 2.38 Tesla.

In an exemplary embodiment, the stator yoke thickness is selected to minimize the stator leakage flux. The main flux is what produces torque and the stator leakage flux is that flux which is not useful. The leakage flux can be estimated using Finite Element Method (FEM) analysis and is typically minimized. Typically it is from 5% to 20% of the main flux, but sometimes it can exceed that range.

The present invention provides a simple and cost effective transverse flux machine that makes use of a stator assemblies divided into a plurality of individual components that are easier to manufacture and assemble. In particular, the present invention simplifies alignment and positioning of the plurality of U-shaped magnetic circuits employed by transverse flux machines.

Although the present invention has been described with reference to preferred embodiments, workers skilled in the art will recognize that changes may be made in form and detail without departing from the spirit and scope of the invention. For instance, the present invention has been described with respect to an interior rotor construction in which the stator assemblies are located around the outer periphery of the rotor. In other embodiments, a reversed construction having an external rotor and an internal stator can be assembled based on the same principles. Additionally, the poles may take any functional shape such as rectangular, squared, or trapezoidal. Similarly, the yokes may take any functional shape such as rectangular, squared, or oval.

The invention claimed is:

1. An electric machine assembly comprising:
a shaft having a major axis;
a ring coil adapted to carry electrical current;
a stator assembly comprising:

a first stator segment positioned circumferentially around the major axis of the shaft and having a plurality of first ferromagnetic poles and a plurality of first slots located about a periphery of the first stator segment wherein each of the first slots is radially aligned with one of the first ferromagnetic poles;

a second stator segment positioned circumferentially around the major axis of the shaft and axially spaced from the first stator segment having a plurality of second ferromagnetic poles and a plurality of second slots located about a periphery of the second stator segment wherein each of the second slots is radially aligned with one of the second ferromagnetic poles; and a plurality of ferromagnetic yokes extending axially between the first and second stator segments to create a plurality of U-shaped magnetic circuits, wherein each yoke has a first end positioned in one of the first slots of the first stator segment and a second end positioned in one of the second slots of the second stator segment, and wherein each of the U-shaped magnetic circuits is comprised of a first ferromagnetic pole associated with the first stator segment, a second ferromagnetic pole associated with the second stator segment, and one of the ferromagnetic yokes connecting the first and second ferromagnetic poles associated with the first stator segment and the second stator segment, respectively; and a rotor assembly having a plurality of permanent magnets.

2. The electric machine assembly of claim 1, wherein the stator assembly surrounds an outer circumference of the rotor assembly, and each of the ferromagnetic poles associated with the plurality of U-shaped magnetic circuits extends toward the permanent magnets arranged around the outer circumference of the rotor assembly.

3. The electric machine assembly of claim 1, wherein each of the plurality of ferromagnetic yokes comprises a soft magnetic composite material.

4. The electric machine assembly of claim 1, wherein each of the first stator segment and the second stator segment comprises a soft magnetic composite material.

5. The electric machine assembly of claim 1, wherein each of the plurality of ferromagnetic yokes comprises a plurality of laminations stacked together along a major surface, wherein each of the ferromagnetic yokes is oriented within the electric machine assembly such that the major surface of the laminations is parallel to the major axis of the shaft.

6. The electric machine assembly of claim 1, wherein each of the first stator segment and the second stator segment comprises a plurality of laminations stacked together along a major surface, wherein each lamination has a plurality of pole protrusions which form a plurality of ferromagnetic poles when stacked together, and the first stator segment and second stator segment are oriented within the electric machine assembly such that the major surface of the laminations is perpendicular to the major axis of the shaft.

7. The electric machine assembly of claim 1, wherein each of the plurality of ferromagnetic yokes includes a protrusion defined along a bottom edge of each yoke such that during assembly the protrusion acts as a spacer between the first stator segment and the second stator segment.

8. The electric machine assembly of claim 1, wherein each of the plurality of pole protrusions defined by the first stator segment and the second stator segment have a two-dimensional geometry selected from the group consisting of: rectangular, square, and trapezoid.

9. The electric machine assembly of claim 1, wherein each of the plurality of yokes have a two-dimensional geometry selected from the group consisting of: rectangular, square, and oval.

10. A stator assembly for use in a transverse flux machine, the stator assembly comprising:

a first stator segment having a plurality of poles spaced around a first circumference of the stator segment and a plurality of slots spaced around a second circumference of the stator segment wherein each of the plurality of slots is radially aligned with one of the plurality of poles;

a second stator segment axially spaced from the first stator segment having a plurality of poles spaced around a first circumference of the second stator segment and a plurality of slots spaced around a second circumference of the stator segment wherein each of the plurality of slots is radially aligned with one of the plurality of poles; and a plurality of stator yokes each having a first end sized to fit within one of the slots associated with the first stator segment and a second end sized to fit in one of the slots associated with the second stator segment, wherein positioning of the first and second ends of the stator yokes within the slots of the first and second stator segments, respectively, results in the creation of a plurality of U-shaped magnetic circuits, each magnetic circuit defined by one of the plurality of poles associated with the first stator segment, one of the yokes, and one of the plurality of poles associated with the second stator segment.

11. The stator assembly of claim 10, wherein the first stator segment, the second stator segment and the stator yokes comprise laminations adapted to conduct magnetic flux through the plurality of U-shaped magnetic circuits.

12. The stator assembly of claim 11, wherein the plurality of laminations associated with the first stator segment and the second stator segment are positioned perpendicular to the plurality of laminations associated with the stator yokes.

13. The stator assembly of claim 10, wherein the first stator segment, the second stator segment and the stator yokes comprise a soft magnetic composite adapted to conduct magnetic flux though each of the plurality of U-shaped magnetic circuits.

14. The stator of claim 10, wherein the number of stator yokes is greater than the number of U-shaped magnetic circuits.

15. The stator of claim 10, further comprising a ring coil positioned between the first and second stator segments such that the plurality of U-shaped magnetic circuits are positioned around a periphery of the ring coil.

16. The stator of claim 10, wherein the stator yokes further comprise a protrusion adapted to space the first and second stator segments from one another.

17. The stator of claim 10, wherein the stator yokes are secured to the slots of the first and second stator segment using a method selected from the group consisting of: welding, riveting, gluing, and encapsulating.

18. A stator assembly for use in a transverse flux machine, the stator assembly comprising:

a first ring-shaped stator segment having a first circumference, a second circumference, a plurality of poles extending radially from the first circumference, and a plurality of slots radially aligned with the plurality of poles extending from the second circumference toward the first circumference;

a second ring-shaped stator segment axially spaced from the first ring-shaped stator segment having a first circumference, a second circumference, a plurality of poles extending radially from the first circumference, and a plurality of slots radially aligned with the plurality of poles extending from the second circumference toward the first circumference; and a plurality of yoke segments extending axially between the first and second ring shaped stator segments, each yoke segment having a first end positioned in one of the slots in the first ring-shaped stator segment and a second end positioned in one of the slots in the second ring-shaped stator segment.

19. The stator assembly of claim 18 wherein the number of slots of the first ring shaped stator segment and the poles of the first ring shaped stator segment are equal and the number of slots of the second ring shaped stator segment and poles of the second ring shaped stator are equal.

20. The stator assembly of claim 18 wherein the second circumference is larger than the first circumference.

\* \* \* \* \*